United States Patent
Robbins

(10) Patent No.: US 9,975,275 B2
(45) Date of Patent: May 22, 2018

(54) EXTRUSION DIE PRE-HEATING DEVICE AND METHOD

(71) Applicant: Paul Henry Robbins, Port Perry (CA)

(72) Inventor: Paul Henry Robbins, Port Perry (CA)

(73) Assignee: EXCO TECHNOLOGIES LIMITED, Markham (CA)

(*) Notice: Subject to any disclaimer, the term of this patent is extended or adjusted under 35 U.S.C. 154(b) by 827 days.

(21) Appl. No.: 13/922,894

(22) Filed: Jun. 20, 2013

(65) Prior Publication Data

US 2014/0027941 A1    Jan. 30, 2014

Related U.S. Application Data

(60) Provisional application No. 61/662,677, filed on Jun. 21, 2012.

(51) Int. Cl.
     *B29C 33/02*      (2006.01)
     *B21C 29/04*      (2006.01)

(52) U.S. Cl.
     CPC .............. *B29C 33/02* (2013.01); *B21C 29/04* (2013.01)

(58) Field of Classification Search
     CPC ................................ B21C 29/04; B29C 33/02
     See application file for complete search history.

(56) References Cited

U.S. PATENT DOCUMENTS

| | | |
|---|---|---|
| 6,884,969 B1 | 4/2005 | Brach et al. |
| 7,393,205 B2 | 7/2008 | Schwartz |
| 2011/0276184 A1* | 11/2011 | McKee ............... H05B 6/6485 700/276 |
| 2013/0187303 A1* | 7/2013 | Robbins ............... B29C 47/802 264/39 |

FOREIGN PATENT DOCUMENTS

| | | |
|---|---|---|
| EP | 0529198 A2 | 3/1993 |
| EP | 0849555 A1 | 6/1998 |
| JP | S6342304 A | 2/1988 |
| JP | 2007313546 A | 12/2007 |

OTHER PUBLICATIONS

Pfau M et al; "Neue Anlage Zur Erwaermung Von Strangpresswerkzeugen"; Umformtechnik, Meisenbach, Bamberg, DE; vol. 34, No. 1; Mar. 1, 2000; p. 20, 23, XP000948888; Issn.: 0300-3167; p. 2.

* cited by examiner

*Primary Examiner* — Robert J Grun
(74) *Attorney, Agent, or Firm* — Young Basile Hanlon & MacFarlane, P.C.

(57) ABSTRACT

A method of pre-heating an extrusion die comprises heating an extrusion die using a first group of heating elements and a second group of heating elements; and then heating the extrusion die using only the first group of heating elements to bring the extrusion die to a desired pre-heat temperature, or heating the extrusion die using the first and second groups of heating elements, the second group of heating elements being operated at reduced power, to bring the extrusion die to a desired pre-heat temperature.

21 Claims, 11 Drawing Sheets

EXTRUSION DIE PRE-HEATING DEVICE AND METHOD

CROSS-REFERENCE TO RELATED APPLICATIONS

This application claims the benefit of U.S. Provisional Application No. 61/662,677 entitled "EXTRUSION DIE PRE-HEATING DEVICE AND METHOD" and filed on Jun. 21, 2012, the content of which is incorporated herein by reference in its entirety.

BACKGROUND

The present invention relates generally to extrusion and in particular, to an extrusion die pre-heating device and method.

Extrusion involves the shaping of a work piece by forcing the work piece through an extrusion die using an extrusion press. During this process, the cross-sectional shape of the extruded work piece generally conforms to the shape of the extrusion die aperture. Metals and metal alloys can be extruded using either "hot extrusion" or "cold extrusion", depending on the temperature at which the extrusion is carried out. During hot extrusion, the work piece and the extrusion die are both maintained at an elevated temperature. For example, aluminum and aluminum alloys are typically hot extruded at temperatures ranging from about 350 degrees Celsius (° C.) to about 500° C.

During the hot extrusion process, extrusion dies are typically pre-heated to the extrusion temperature in a separate oven prior to being installed in the extrusion press. This pre-heating reduces the time needed to bring the extrusion press to operating conditions, thereby increasing the throughput of the extrusion press.

Equipment for pre-heating extrusion dies has been previously considered. For example, U.S. Pat. No. 7,393,205 to Schwartz discloses a device for heating up extrusion dies prior to their installation in an extruder, whereby the extrusion dies are heated up to a prescribed temperature and kept at this temperature. The device comprises a gas-tight and thermally insulated oven housing that has at least one charging and discharging opening with an oven cover and, inside the oven housing, there is an impact nozzle field into which an extrusion die can be placed. The device is provided with a heating means that heats up a fluid that flows through the openings of the impact nozzle field.

U.S. Pat. No. 6,884,969 to Brach et al. discloses an infrared die oven having a die cradle for holding a die. A thermocouple is positioned within the die cradle to maintain it in direct contact with the die. A controller connected to the thermocouple continually reads the temperature of the die. When the die reaches a threshold temperature, the intensity of an infrared heating element in the oven is reduced. When the die reaches the desired temperature, the controller continuously adjusts the heater intensity to maintain the die at the desired temperature.

European Patent Application No. 0529198 to Perdersoli discloses a controlled-atmosphere furnace for preheating dies for extruding aluminum and alloys thereof. The furnace includes a supporting frame which delimits, at a portion of a side wall, at least one chamber which can be closed tight with respect to the outside environment, a chamber door which can be opened outward and has a supporting frame for a part to be preheated, and resistors for heating the chamber.

Although known devices and methods for extrusion die pre-heating may be adequate, improvements are generally desired. It is therefore an object at least to provide a novel extrusion die pre-heating device and method.

SUMMARY

Accordingly, in one aspect there is provided a method of pre-heating an extrusion die comprising: heating an extrusion die using a first group of heating elements and a second group of heating elements; and then heating the extrusion die using only the first group of heating elements to bring the extrusion die to a desired pre-heat temperature, or heating the extrusion die using the first and second groups of heating elements, the second group of heating elements being operated at reduced power, to bring the extrusion die to a desired pre-heat temperature.

The heating elements of the first group may face generally flat end faces of the extrusion die, wherein the heating elements of the second group face a curved outer surface of the extrusion die.

During heating using the first and second groups of heating elements, the extrusion die may be heated until a surrounding temperature higher than the desired pre-heat temperature is reached.

The desired pre-heat temperature may be in the range from about 750 to about 900 degrees Fahrenheit. The desired pre-heat temperature may be about 875 degrees Fahrenheit.

In another aspect, there is provided an extrusion die pre-heating device comprising: at least one die oven comprising a first plurality of opposing walls supporting a first group of heating elements, and a second plurality of opposing walls supporting a second group of heating elements; and a controller, configured to operate the first and second groups of heating elements independently for pre-heating an extrusion die placed in the at least one die oven.

The heating elements of the first group may be positioned to face generally flat end faces of the extrusion die, wherein the heating elements of the second group are positioned to face a curved outer surface of the extrusion die.

The controller may be configured to: operate the first and second groups of heating elements until the surrounding temperature reaches a first temperature; and then operate only the first group of heating elements to bring the extrusion die to a second temperature, or operate the first and second groups of heating elements, the second group of heating elements being operated at reduced power, to bring the extrusion die to a second temperature.

The first temperature may be higher than the second temperature. The first temperature may be in the range from about 900 to about 1100 degrees Fahrenheit. The second temperature may be a desired pre-heat temperature of the extrusion die. The desired pre-heat temperature may be in the range from about 750 to about 900 degrees Fahrenheit. The desired pre-heat temperature may be about 875 degrees Fahrenheit.

In still another aspect, there is provided a method of pre-heating an extrusion die comprising: heating an extrusion die using a plurality of heating elements, the heating elements being located at positions generally to surround the extrusion die; and then heating the extrusion die using only a first subset of the heating elements, or heating the extrusion die using the plurality of heating elements with a second subset of the heating elements operating at reduced power.

During heating of the extrusion die using a plurality of heating elements, heating elements adjacent opposite sides and adjacent opposite ends of the extrusion die may be operated, wherein during heating of the extrusion die using only the first subset of the heating elements, only the heating elements adjacent opposite ends of the extrusion die are operated.

During heating of the extrusion die using a plurality of heating elements, heating elements adjacent opposite sides and adjacent opposite ends of the extrusion die may be operated, wherein during heating of the extrusion die using the plurality of heating elements with the second subset of the heating elements operating at reduced power, the heating elements adjacent a curved outer surface of the extrusion die are operated at reduced power.

In still another aspect, there is provided an extrusion die pre-heating device comprising: at least one die oven comprising a chamber and a plurality of heating elements, the heating elements being located at positions generally to surround an extrusion die accommodated by the chamber; and a controller configured to operate the heating elements until the chamber reaches a first temperature and then to operate a first subset of the heating elements to bring the extrusion die to a desired pre-heat temperature, or to operate the heating elements by operating a second subset of the heating elements at reduced power to bring the extrusion die to a desired pre-heat temperature.

The at least one die oven may comprise heating elements adjacent opposite sides and adjacent opposite ends of the extrusion die, the controller configured to operate all of the heating elements until the chamber reaches the first temperature and configured to operate only the heating elements adjacent opposite ends of the extrusion die to bring the extrusion die to the desired pre-heat temperature.

The at least one die oven may comprise heating elements adjacent opposite sides and adjacent opposite ends of the extrusion die, the controller configured to operate all of the heating elements until the chamber reaches the first temperature and configured to operate the heating elements adjacent a curved outer surface of the extrusion die at reduced power to bring the extrusion die to the desired pre-heat temperature.

The first temperature may be in the range from about 900 to about 1100 degrees Fahrenheit. The desired pre-heat temperature may be in the range from about 750 to about 900 degrees Fahrenheit. The desired pre-heat temperature may be about 875 degrees Fahrenheit.

BRIEF DESCRIPTION OF THE DRAWING

Embodiments will now be described more fully with reference to the accompanying drawings in which.

DETAILED DESCRIPTION

Figure 1:
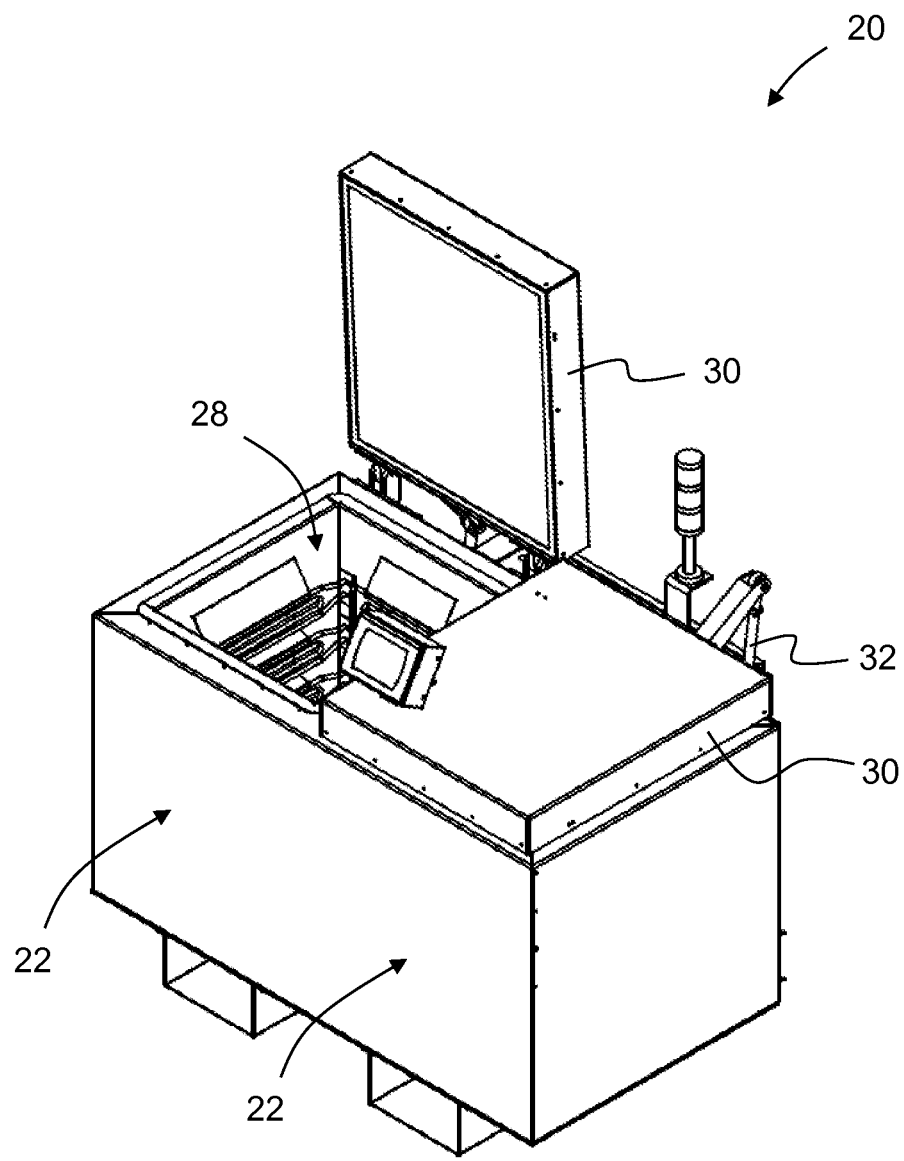
FIG. 1 is a perspective view of an extrusion die pre-heating device.
Figure 2:
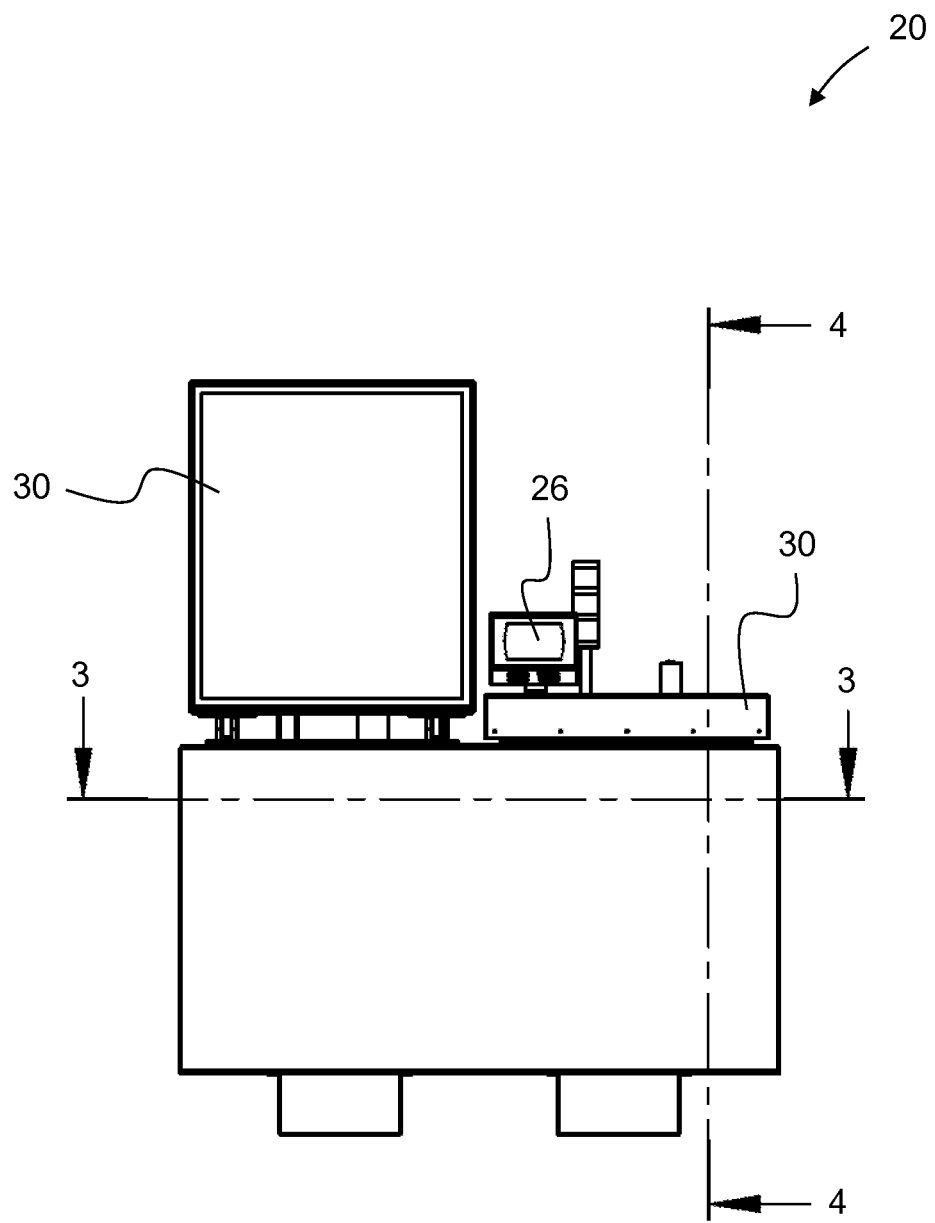
FIG. 2 is front elevational view of the extrusion die pre-heating device of FIG. 1.
Figure 3:
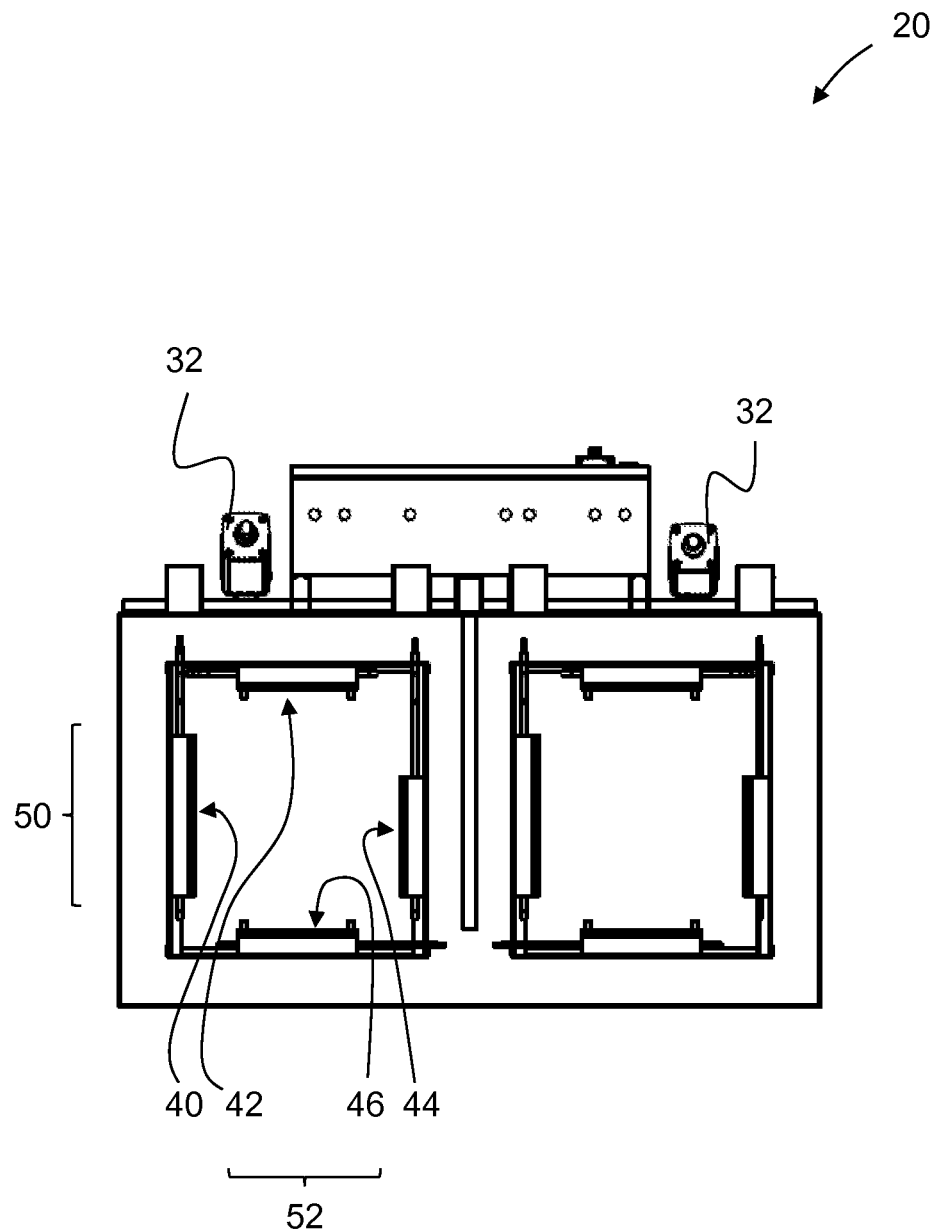
FIG. 3 is a top sectional view of the extrusion die pre-heating device of FIG. 1, taken along section line 3-3 indicated in FIG. 2.
Figure 4:
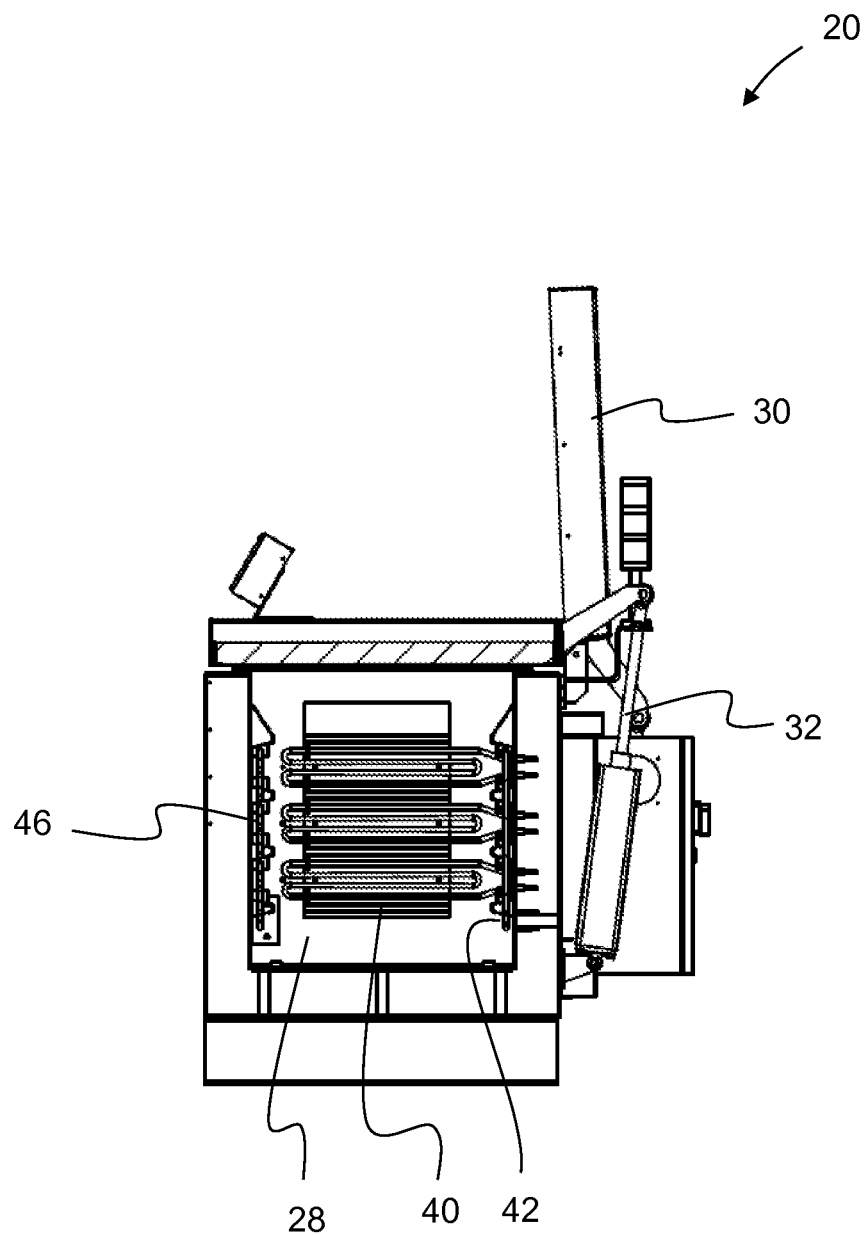
FIG. 4 is a side sectional view of the extrusion die pre-heating device of FIG. 1, taken along section line 4-4 indicated in FIG. 2.

Turning now to FIGS. 1 to 4, an extrusion die pre-heating device or apparatus for heating extrusion dies prior to their installation in an extruder is shown, and is generally identified by reference numeral 20. In this embodiment, extrusion die pre-heating device 20 comprises a pair of die ovens 22, with each die oven 22 being configured to accommodate and heat an extrusion die 24 placed therein. The extrusion die pre-heating device 20 also comprises a controller 26 that is configured to operate each die oven 22 according to an associated thermal program stored in memory thereof in order to heat the extrusion die 24 placed therein to a desired pre-heat temperature.

Each die oven 22 comprises a die oven chamber 28 that is enclosed by four (4) upright walls, a floor and an upper lid 30. The upper lid 30 is opened and closed during transfer of extrusion dies into and out of the die oven chamber 28 through operation of a hydraulic actuator 32. Each die oven 22 also comprises four (4) heating elements 40, 42, 44 and 46, each of which is supported on a respective one of the upright walls enclosing the die oven chamber 28. Heating elements 40 and 44 are supported on one pair of opposite upright walls and form a first heating element group 50 Heating elements 42 and 46 are supported on the other pair of opposite upright walls and form a second heating element group 52.

The controller 26 is configured to operate the first and second heating element groups 50 and 52 of each die oven 22 according to its associated thermal program. Each thermal program comprises temperature set point data, set point time data, and heating element group data. The set point time data specifies times at which respective temperature set points are to be reached, while the heating element group data specifies which of the heating element groups 50 and 52 are to be used for reaching respective temperature set points specified by the temperature set point data.

Figure 5A:
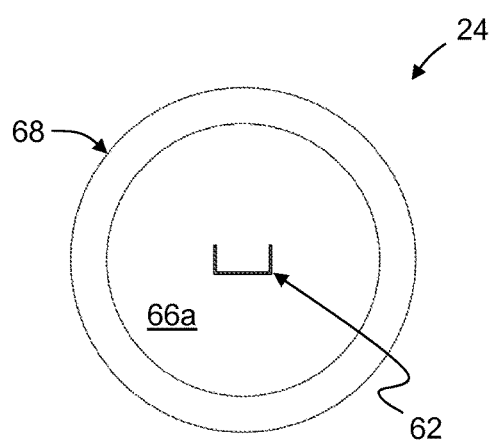
FIGS. 5a, 5b and 5c are front elevational, side elevational and perspective views, respectively, of an extrusion die.
Figure 5B:
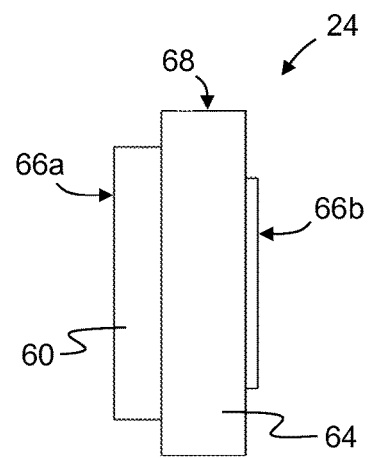
Figure 5C:
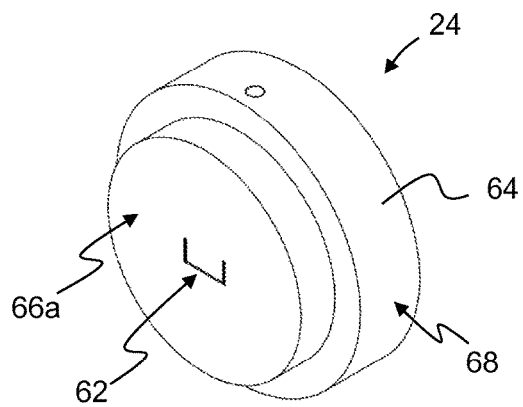

FIGS. 5a to 5c show an exemplary extrusion die 24. In the embodiment shown, the extrusion die 24 comprises an inner, generally cylindrical die plate 60 that has a die aperture 62 extending therethrough. The die plate 60 is contained within an outer, generally cylindrical die ring 64. The die plate 60 defines the two (2) generally flat end faces 66a and 66b of the extrusion die 24 while the die ring 64 defines the curved outer surface 68 of the extrusion die 24.

Figure 6:
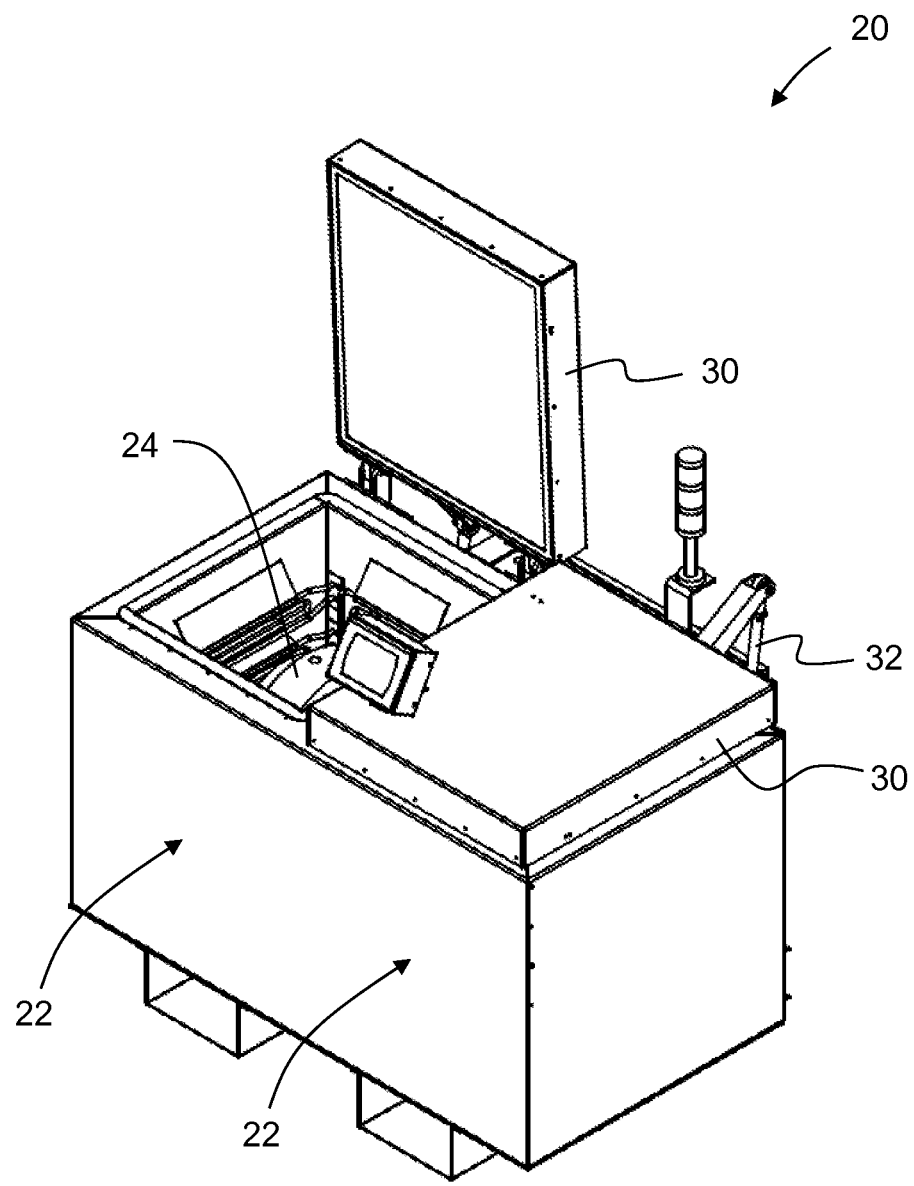
FIG. 6 is a perspective view of the extrusion die pre-heating device of FIG. 1, showing one of the die ovens thereof in an open condition and loaded with an extrusion die.
Figure 7:
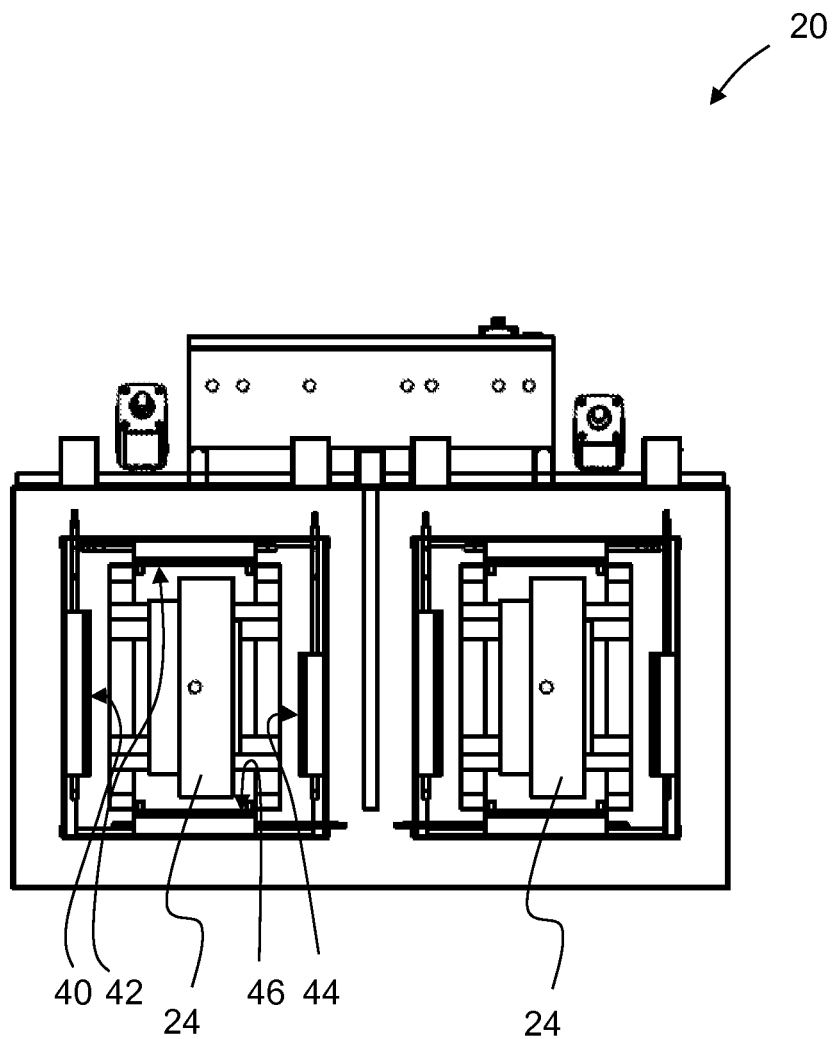
FIG. 7 is a top sectional view of the extrusion die pre-heating device of FIG. 6.
Figure 8:
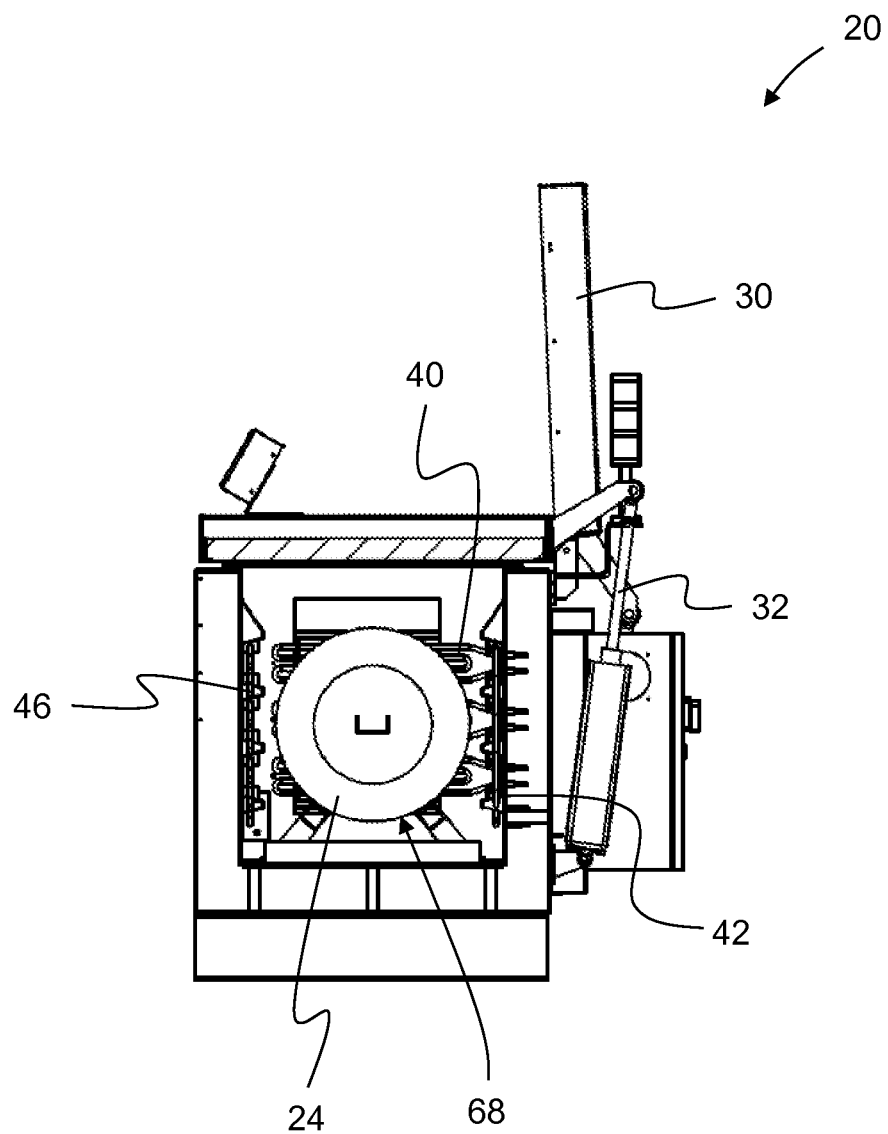
FIG. 8 is a side sectional view of the extrusion die pre-heating device of FIG. 6.

When it is desired to use the extrusion die pre-heating device 20 to pre-heat one or more extrusion dies 24, the upper lid 30 of each die oven 22, that is to accommodate an extrusion die 24 to be pre-heated, is opened via actuation of its hydraulic actuator 32. A hoist (not shown) is then used to load an extrusion die 24 into the die oven chamber 28 of each open die oven 22, and the upper lid 30 of each loaded die oven chamber 28 is closed. FIGS. 6 to 8 show the extrusion die pre-heating device 20 after an extrusion die 24 has been loaded into the die oven chamber 28 of each die oven 22. As can be seen, after loading, each extrusion die 24 is oriented within the die oven 22 such that the flat end faces 66a and 66b are positioned proximate to and face the heating elements 40 and 44, and such that the curved outer surface 68 is positioned proximate to and faces the heating elements 42 and 46. In this manner, the end faces 66a and 66b of the extrusion die 24 receive direct radiant heat from the first heating element group 50, while the curved outer surface 68 of the extrusion die 24 receives direct radiant heat from the second heating element group 52.

Figure 9:
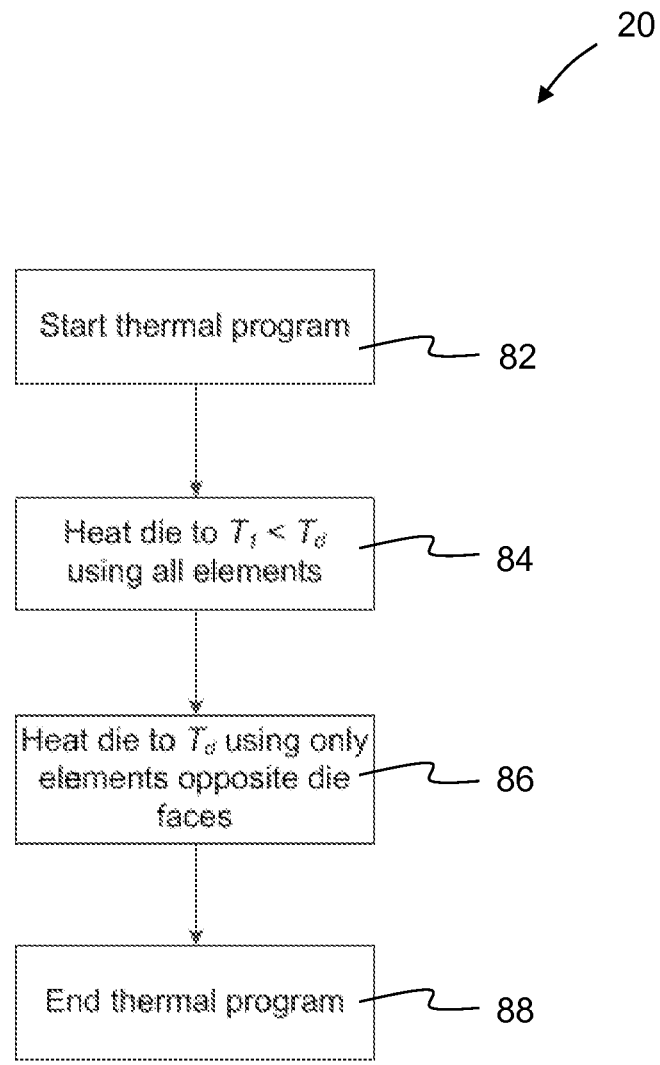
FIG. 9 is a flow chart showing steps of an extrusion die pre-heating process used by the extrusion die pre-heating device of FIG. 1.

Once each die oven 22 that is to accommodate an extrusion die 24 to be heated, has been loaded with an extrusion die, the controller 26 is conditioned via operator input to run the thermal program associated with each die oven 22 (see step 82 in FIG. 9). Initially, during a first stage, for each die oven 22, the thermal program causes the controller 26 to operate both heating element groups 50 and 52, namely all four (4) heating elements 40 to 46, to heat the extrusion die 24 (step 84) for a duration specified by the set point time data and until the temperature within the die oven chamber 28 reaches a first temperature set point, $T_a$. The first temperature set point, $T_a$, is higher than the desired pre-heat temperature, $T_d$, of the extrusion die 24. At the end of the first stage, the average internal temperature, $T_1$, of the die plate 60, is below the desired pre-heat temperature, $T_d$, of the extrusion die 24.

Following this and during a second stage, for each die oven 22, the thermal program causes the controller 26 to stop operation of the second heating element group 52 but continue to operate the first heating element group 50, namely heating elements 40 and 44. As a result, the end faces 66a and 66b of the extrusion die 24, which are proximate to and face the heating elements 40 and 44 are subjected to further radiant heating (step 86). Operation of only the first heating element group 50 continues for a duration specified by the set point time data and until the temperature within the die oven chamber 28 reaches a second temperature set point equal to the desired pre-heat temperature, $T_d$. At the end of the second stage, the average internal temperature, $T_1$, of the die plate 60 of the extrusion die 24, is also at about the desired pre-heat temperature, $T_d$. With the die plate 60 of the extrusion die 24 at about the desired pre-heat temperature, $T_d$, the thermal program is terminated (step 88). In this embodiment, the thermal program is terminated by the controller 26 in response to operator input.

Following step 88, each extrusion die 24 that has been pre-heated to the desired pre-heat temperature, $T_d$, may be unloaded from the die oven chamber 28 in which it is located using the hoist and then, for example, loaded into an extruder for production.

By initially using all four (4) heating elements to heat each extrusion die 24 to be pre-heated, each extrusion die 24, and more specifically the die plate 60 thereof, may advantageously be brought quickly to a temperature near to, but lower than, the desired pre-heat temperature, $T_d$, by heating generally all surfaces of the extrusion die 24. As will be understood, at the end of the first stage, the temperature of the die ring 64 will be higher than the average internal temperature of the die plate 60. This temperature difference occurs as a result of the shape of the extrusion die 24 and its position within the die oven chamber 28, which results in the curved outer surface 68 being closer to heating elements 42 and 46 than the end faces 66a and 66b are to heating elements 40 and 44. This temperature difference also occurs as a result of generally low thermal conductivity between the die ring 64 and the die plate 60.

By using only two (2) heating elements opposite the end faces 66a and 66b during the second stage of the thermal program, only the die plate 60 receives direct radiant heat, allowing any temperature difference between the die ring 64 and the die plate 60 to be reduced or eliminated.

As will be appreciated, this approach advantageously reduces overheating of the die ring 64 as the temperature of the extrusion die 24 approaches the desired pre-heat temperature, $T_d$. Additionally, reducing or eliminating the temperature difference between the die ring 64 and the die plate 60 improves the temperature uniformity within the die plate 60, and thereby allows the extrusion die 24 to be uniformly brought to the desired pre-heat temperature, $T_d$, more quickly. As a result, the total time and the total amount of thermal energy needed to bring each extrusion die 24 to the desired pre-heat temperature, $T_d$, are advantageously reduced, thereby providing an extrusion die pre-heating process that is more efficient as compared to conventional processes.

Although in the embodiment described above, the thermal program causes the controller to stop operation of the second heating element group during the second stage, in other embodiments, the thermal program may alternatively cause the controller to operate the second heating element group during the second stage in a manner such that the curved outer surface of the extrusion die receives less direct radiant heat than during the first stage. For example, in one such embodiment, the thermal program may cause the controller to operate the second heating element group at reduced power during the second stage. It will be understood that reduced power may comprise one or more of, for example, reduced power intensity and power cycling. In such an embodiment, the thermal program may further comprise at least one of power intensity data and power cycling data.

Although in the embodiment described above, the extrusion die pre-heating process uses a thermal program associated with each die oven that comprises a first stage and a second stage, in other embodiments, the extrusion die pre-heating process may alternatively use thermal programs comprising more than two stages. For example, in another embodiment, the extrusion die pre-heating process may alternatively use a thermal program associated with each die oven that comprises a first stage, a second stage and a third stage. In this embodiment, during the first stage, the first and second heating element groups are operated by the controller 26 for a duration specified by the set point time data and until the temperature within each die oven 22 reaches a first temperature set point, $T_a$, with the first temperature set point, $T_a$ being higher than the desired pre-heat temperature, $T_d$. During the second stage, only the first heating element group is operated by the controller 26 for a duration specified by the set point time data and until the temperature within each die oven 22 reaches a second temperature set point, $T_b$, with the second temperature set point, $T_b$, being lower than the first temperature set point, $T_a$, but higher than the desired pre-heat temperature, $T_d$. During the third stage, again only the first heating group element is operated by the controller 26 for a duration specified by the set point time data and until the temperature within each die oven reaches the desired pre-heat temperature, $T_d$.

Although the extrusion die pre-heating device is shown as comprising a pair of die ovens, those of skill in the art will appreciate that the extrusion die pre-heating device may alternatively comprise a single die oven or more than two die ovens. Also, although each die oven is described as having an associated thermal program, those of skill in the art will appreciate that a single thermal program may be used by the controller to control more than one or all of the die ovens of the extrusion die pre-heating device.

Although the die oven chamber is shown as being enclosed by four (4) upright walls, those of skill in the art will appreciate that the die oven chamber may alternatively be enclosed by fewer or more walls. For example, in one such embodiment, the die oven chamber may alternatively be enclosed by a curved, single wall extending around the periphery of the chamber Although in the embodiment described above, the thermal program comprises temperature set point data, set point time data, and heating element group data, in other embodiments, the thermal program may alternatively comprise temperature set point data and heating element group data, and no set point time data. In one such embodiment, the thermal program causes the controller to operate one or more heating element groups until the temperature within the die oven chamber reaches a temperature set point. In other embodiments, the thermal program may alternatively comprise set point time data and heating element group data, and no temperature set point data. In one such embodiment, the thermal program causes the controller to operate one or more heating element groups for a duration specified by the set point time data. It will be understood that operation of one or more heating element groups for the duration specified by the set point time data causes any of the chamber and an extrusion die to reach a temperature that may be generally predictable through calibration of the die oven, for example.

It will be understood that the desired pre-heat temperature may be generally any temperature suitable for loading the pre-heated extrusion die into an extruder for production.

The following example illustrates various applications of the above-described devices and methods.

EXAMPLE

Figure 10A:
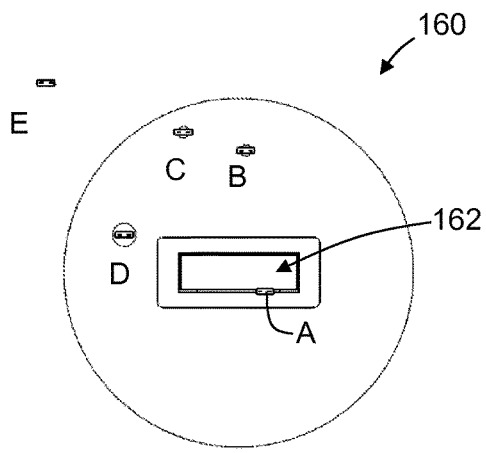
FIGS. 10a, 10b and 10c are front elevational, side elevational and top plan views, respectively, of a die plate forming part of another embodiment of an extrusion die.
Figure 10B:
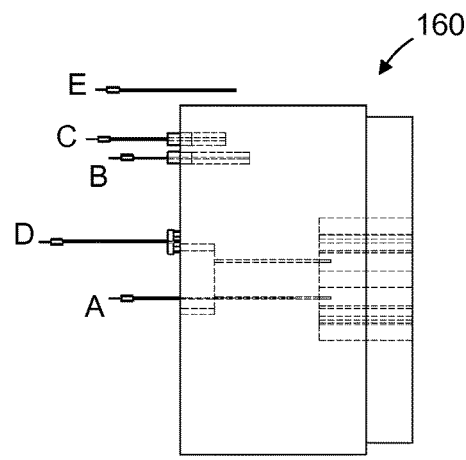
Figure 10C:
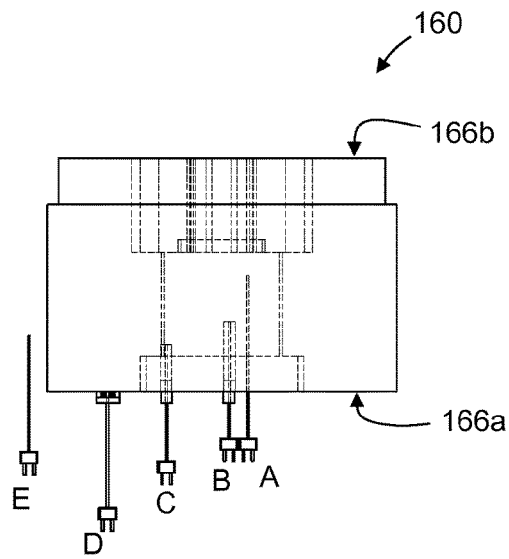

FIGS. 10a to 10c show a die plate 160 forming part of an extrusion die that was subjected to the die pre-heating process described above. The die plate 160 has a die aperture 162 extending therethrough. The die plate 160 is contained within an outer die ring (not shown). The die plate 160 has flat surfaces that define the two (2) generally flat end faces 166a and 166b of the extrusion die. The die ring has a curved outer surface (not shown) that defines the curved surface of the extrusion die.

During the die pre-heating process, the extrusion die had a set of five (5) thermocouples positioned in proximity therewith, namely thermocouples A, B, C, D and E. Thermocouple A was positioned adjacent a surface of the die aperture 162. Thermocouple B was positioned in a bore within the interior of the die plate 160. Thermocouple C was positioned in another bore within the interior of the die plate 160, and closer to the die ring than thermocouple B. Thermocouple D was affixed to the end face 166a of the extrusion die. Thermocouple E was positioned in the chamber of the die oven (not shown).

The die pre-heating process used a thermal program comprising three stages, namely a first stage, a second stage and a third stage. The desired pre-heat temperature was $T_d$=860 degrees Fahrenheit (deg. F.).

During the first stage of the thermal program, both heating element groups, namely all four (4) heating elements were used to heat the extrusion die. The first stage comprised a first temperature set point of $T_a$=1085 deg. F., and ran from a time of t=0 minutes to t=52 minutes.

During the second and third stages of the thermal program, only the heating elements facing the end faces 166a and 166b were used to heat the extrusion die. The second stage comprised a second temperature set point of $T_b$=1000 deg. F., and ran from t=52 minutes to t=75 minutes.

The third stage comprised a third temperature set point equal to the desired pre-heat temperature $T_d$=860 deg. F., and ran from t=75 minutes.

Figure 11:
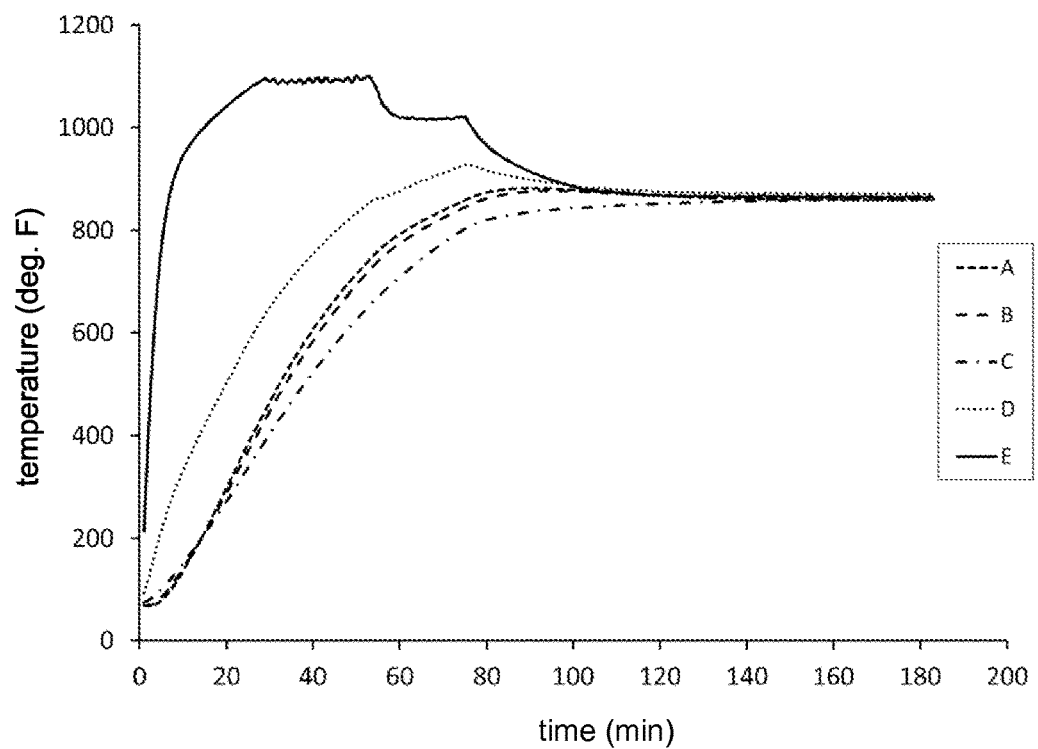
FIG. 11 is a graphical plot of extrusion die temperature measured by thermocouples over time.

FIG. 11 shows the temperatures measured by thermocouples A, B, C, D and E during running of the thermal program. As will be appreciated, the die plate 160 was uniformly brought to the desired pre-heat temperature in a generally quick and efficient manner.

Although embodiments have been described above with reference to the accompanying drawings, those of skill in the art will appreciate that variations and modifications may be made without departing from the scope thereof as defined by the appended claims.

What is claimed is:

1. An extrusion die pre-heating device comprising:
   at least one die oven comprising a first plurality of opposing walls supporting a first group of heating elements, the first group of heating elements comprising at least one first heating element supported on each wall of said first plurality of opposing walls, and a second plurality of upright opposing walls supporting a second group of heating elements, the second group of heating elements comprising at least one second heating element supported on each wall of said second plurality of upright opposing walls; and
   means for operating the first and second groups of heating elements independently to pre-heat an extrusion die placed in the at least one die oven.

2. The device of claim 1, wherein the heating elements of the first group are positioned to face generally flat end faces of the extrusion die, and wherein the heating elements of the second group are positioned to face a curved outer surface of the extrusion die.

3. The device of claim 2, wherein the controller is configured to:
   operate the first and second groups of heating elements until the surrounding temperature reaches a first temperature; and then
   operate only the first group of heating elements to bring the extrusion die to a second temperature, or
   operate the first and second groups of heating elements, the second group of heating elements being operated at reduced power, to bring the extrusion die to a second temperature.

4. The device of claim 3, wherein the first temperature is higher than the second temperature.

5. The device of claim 3, wherein the first temperature is in the range from about 900° to about 1100° Fahrenheit.

6. The device of claim 3, wherein the second temperature is a desired pre-heat temperature of the extrusion die.

7. The device of claim 3, wherein the desired pre-heat temperature is in the range from about 750 to about 900 degrees Fahrenheit.

8. The device of claim 3, wherein the desired pre-heat temperature is about 875° Fahrenheit.

9. The device of claim 1, wherein said at least one die oven comprises two or more die ovens.

10. The device of claim 1, wherein the controller is configured to:
   operate the first and second groups of heating elements until the surrounding temperature reaches a first temperature; and then
   operate only the first group of heating elements to bring the extrusion die to a second temperature, or operate the first and second groups of heating elements, the second group of heating elements being operated at reduced power, to bring the extrusion die to a second temperature.

11. The device of claim 10, wherein the first temperature is higher than the second temperature.

12. The device of claim 10, wherein the second temperature is a desired pre-heat temperature of the extrusion die.

13. A method of pre-heating an extrusion die comprising:
inserting the extrusion die into the device of claim 1;
heating an extrusion die using the plurality of heating elements, the heating elements being located at positions generally to surround said extrusion die; and then
heating the extrusion die using only a first subset of the heating elements, or
heating the extrusion die using the plurality of heating elements with a second subset of the heating elements operating at reduced power.

14. The method of claim 13, wherein during heating of the extrusion die using a plurality of heating elements, heating elements adjacent opposite sides and adjacent opposite ends of said extrusion die are operated and wherein during heating of the extrusion die using only the first subset of the heating elements, only the heating elements adjacent opposite ends of said extrusion die are operated.

15. The method of claim 13, wherein during heating of the extrusion die using a plurality of heating elements, heating elements adjacent opposite sides and adjacent opposite ends of said extrusion die are operated and wherein during heating of the extrusion die using the plurality of heating elements with the second subset of the heating elements operating at reduced power, the heating elements adjacent a curved outer surface of said extrusion die are operated at reduced power.

16. A method of pre-heating an extrusion die comprising:
inserting the extrusion die into the extrusion die heating device of claim 1;
heating an extrusion die using the first group of heating elements and the second group of heating elements; and then
heating the extrusion die using the first group of heating elements to bring the extrusion die to a desired pre-heat temperature, or
heating the extrusion die using the first and second groups of heating elements, the second group of heating elements being operated at reduced power, to bring the extrusion die to a desired pre-heat temperature.

17. The method of claim 16, wherein the heating elements of the first group face generally flat end faces of the extrusion die, and wherein the heating elements of the second group face a curved outer surface of the extrusion die.

18. The method of claim 17, wherein during heating using the first and second groups of heating elements, the extrusion die is heated until a surrounding temperature higher than the desired pre-heat temperature is reached.

19. The method of claim 16, wherein during heating using the first and second groups of heating elements, the extrusion die is heated until a surrounding temperature higher than the desired pre-heat temperature is reached.

20. The method of claim 16, wherein the desired pre-heat temperature is in the range from about 750° to about 900° Fahrenheit.

21. The method of claim 16, wherein the desired pre-heat temperature is about 875° Fahrenheit.

* * * * *